United States Patent

[11] 3,554,467

| [72] | Inventor | Maurice A. Yowell Kenne, Tex. |
|---|---|---|
| [21] | Appl. No. | 706,420 |
| [22] | Filed | Feb. 19, 1968 |
| [45] | Patented | Jan. 12, 1971 |
| [73] | Assignee | Universal Helicar Company Midland, Tex. a corporation of Texas |

[54] COUNTER-ROTATING ROTOR TRANSMISSION FOR HELICOPTERS
4 Claims, 8 Drawing Figs.

[52] U.S. Cl. .................................................... 244/17.19; 416/121, 416/129
[51] Int. Cl. .................................................... B64c 27/52
[50] Field of Search .......................................... 170/135.26, 160.26; 244/17.11, 17.19, 17.21, 17.23, 17.25, 17.27; 416/121, 129

[56] References Cited
UNITED STATES PATENTS

| 2,415,999 | 2/1947 | Frasher ...................... | 170/135.26X |
|---|---|---|---|
| 2,518,623 | 8/1950 | Judge ........................ | 170/135.26X |
| 2,418,407 | 4/1947 | Hays .......................... | 244/17.25 |
| 2,532,683 | 12/1950 | Traver ........................ | 244/17.23X |
| 2,569,882 | 10/1951 | DeBothezat ................. | 244/17.25 |
| 2,724,446 | 11/1955 | Hill ............................ | 244/17.25X |
| 2,879,956 | 3/1959 | Brand ......................... | 244/17.23X |
| 3,411,737 | 11/1968 | Godwin ...................... | 244/17.19 |
| 2,563,047 | 8/1951 | Kisner ........................ | 170/135.26 |

FOREIGN PATENTS

| 936,071 | 2/1948 | France ........................ | 170/135.26 |
|---|---|---|---|
| 947,645 | 1/1949 | France ........................ | 170/135.26 |

Primary Examiner—Milton Buchler
Assistant Examiner—Paul E. Sauberer
Attorney—Clarence A. O'Brien & Harvey B. Jacobson ABSTRACT: A helicopter having counter-rotating airfoil blades driven from a single drive shaft through a pivoted transmission which may be canted with the blades. Vertical stabilizers are mounted by the helicopter air frame in the downdraft of the rotor blades to overcome gyroscopic forces while the control movements of the stabilizers are interrelated with pivotal movement of the transmission on the airframe for flight stabilization and directional maneuverability.

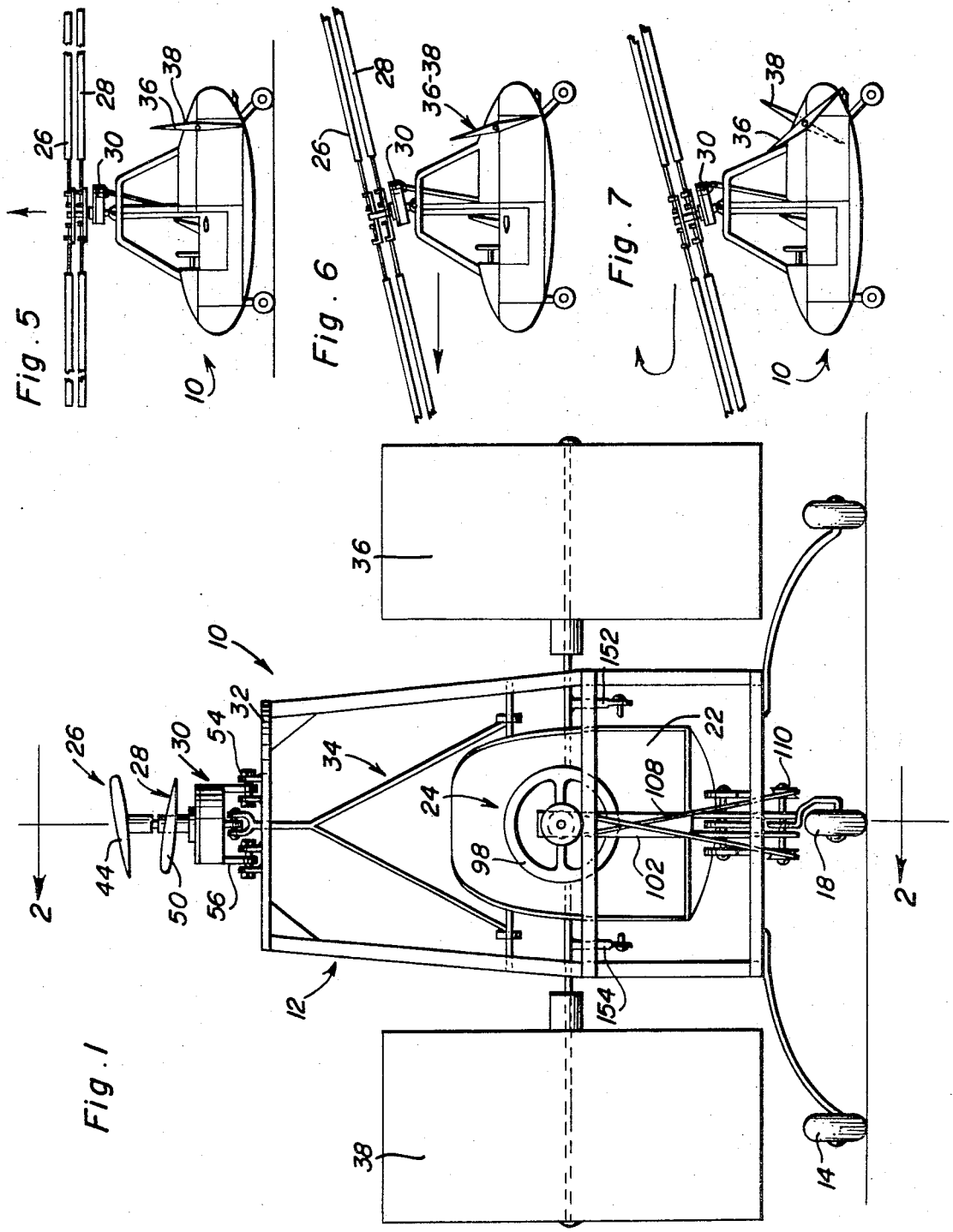

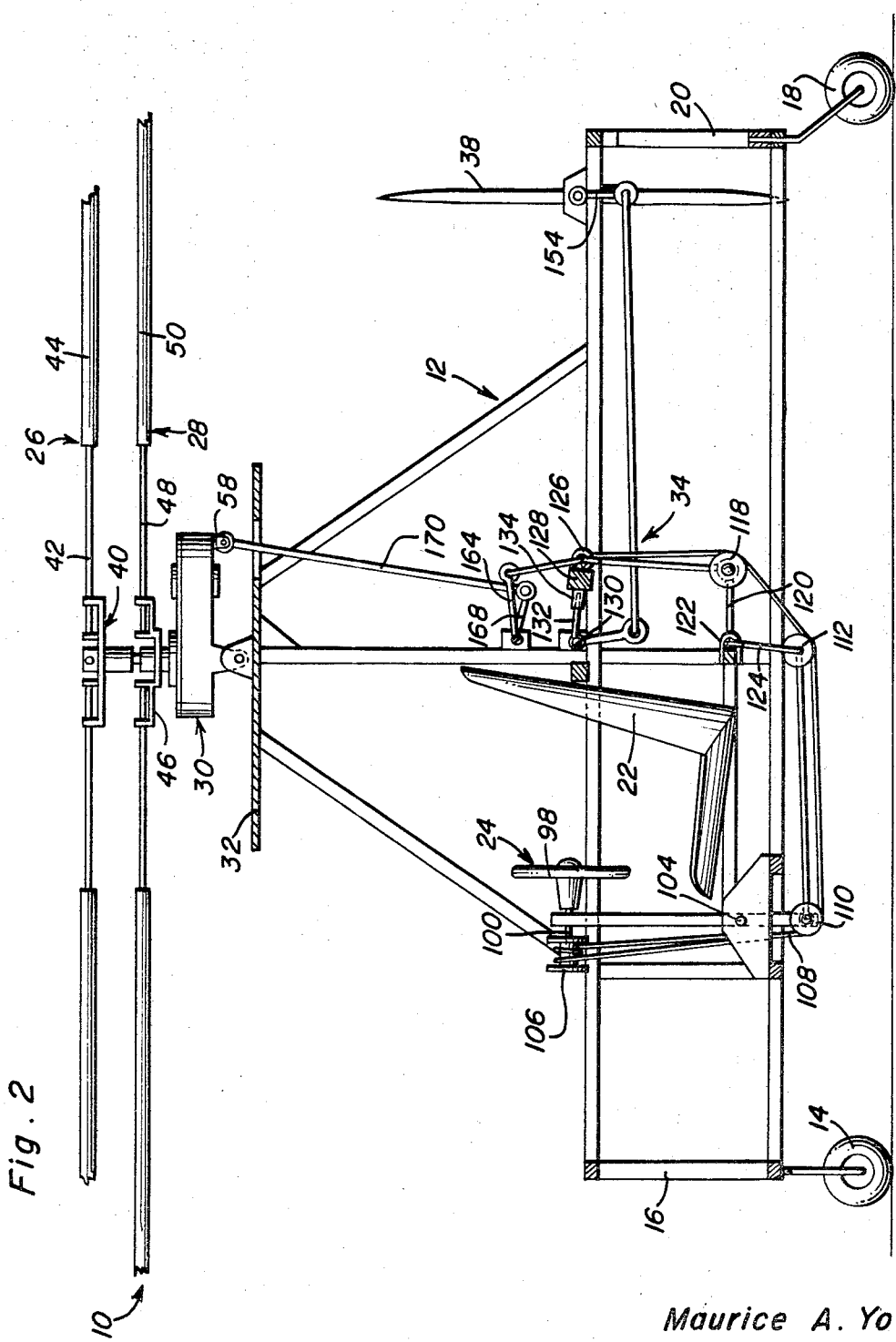

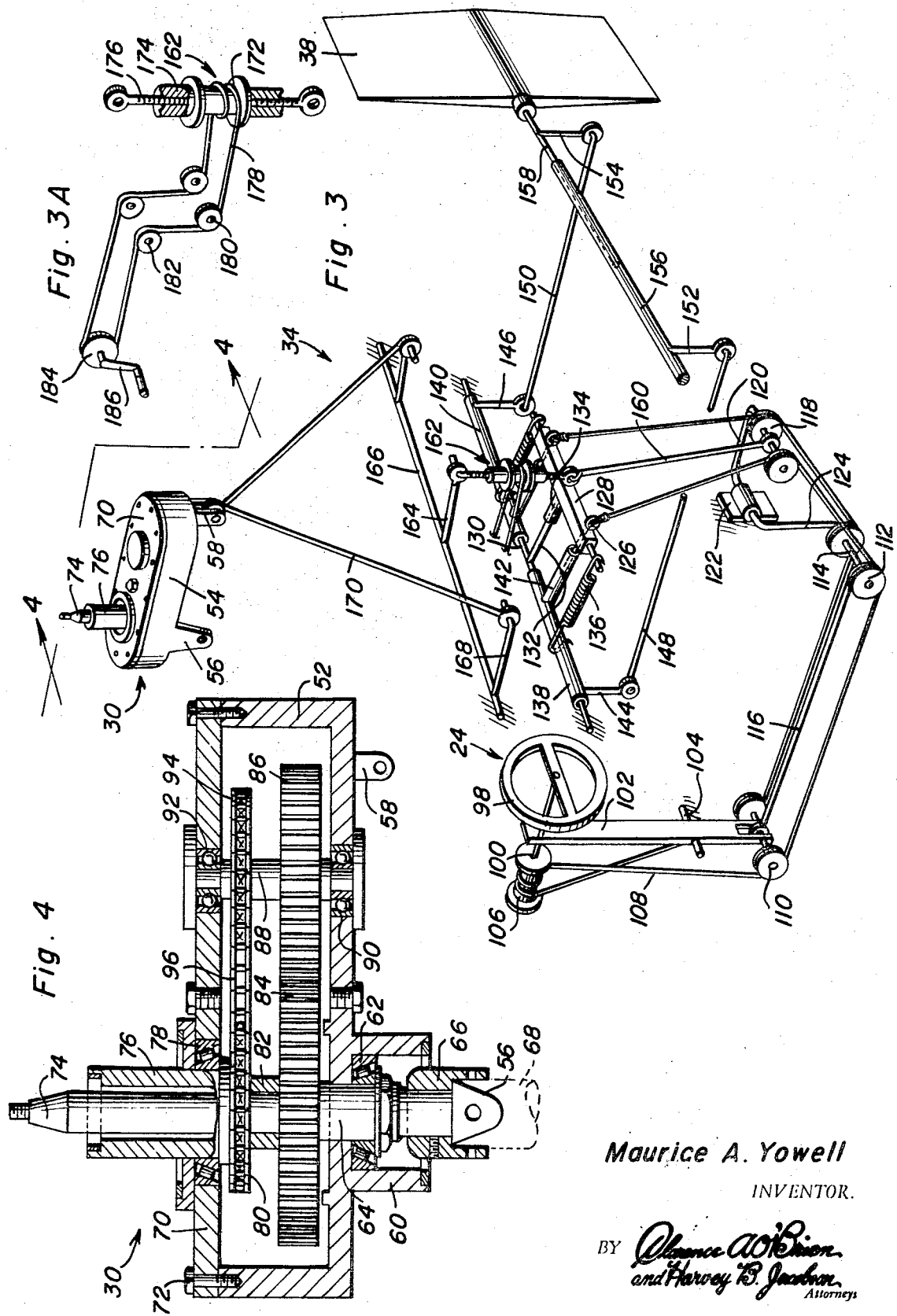

COUNTER-ROTATING ROTOR TRANSMISSION FOR HELICOPTORS

This invention relates to helicopters and more particularly to transmission and controls associated with counterrotating helicopter rotor blades. Counterrotating airfoil blade assemblies are generally employed for helicopter aircraft in order to cancel the reaction torque that would otherwise be imposed on the helicopter airframe by blade assemblies rotating in one direction. Vertical and horizontal stabilizers are also employed at one end of such craft to control lateral stability. Directional movement of the helicopter is generally attained by tilting the craft in the desired direction of flight to convert some of the lift force into a propelling force component. Thus, lift and propulsion forces become interrelated.

An important object of the present invention therefore, is to improve control over both lift and propulsion in a counterrotating blade type of helicopter. This objective is achieved in a relatively simple manner utilizing a single power shaft for drive of both counterrotating rotor assemblies and without sacrifice of flight stability and directional maneuverability.

In accordance with the present invention, the counterrotating rotor assemblies are driven at equal speeds in opposite directions from a single power shaft through a transmission that is capable of pivoting or canting with the rotor assemblies relative to the helicopter air frame in order to maintain a level attitude for the air frame at all times. Thus, the efficiency of the helicopter is improved because aerodynamic changes due to canting of the air frame are avoided. The airfoil blade pitch of the top rotor assembly is arranged to maintain maximum efficiency while the bottom rotor airfoil blades are set at a lesser pitch but equal lift thereby overcoming any torque reaction. Vertical stabilizers are also mounted by the helicopter airframe within the downdraft of the rotors so as to assist in the canting of the transmission relative to the airframe by overcoming the gyroscopic forces produced by rotation of the rotors without disturbing the level attitude of the craft. These vertical stabilizers when pivotally displaced in opposite directions will also control directional stability. Relatively simple controls may be provided for canting the transmission and rotor blades for directional propulsion or to maintain level attitude. These controls will also provide means for directionally maneuvering the craft by interrelated movement of the transmission and the vertical stabilizers.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a front elevational view of a helicopter constructed in accordance with the present invention with its outer shell or skin removed.

FIG. 2 is a side sectional view taken substantially through a plane indicated by section line 2—2 in FIG. 1.

FIG. 3 is a schematic perspective view showing the control system associated with the helicopter illustrated in FIGS. 1 and 2.

FIG 3a is an enlarged partial sectional view showing another portion of the control system.

FIG. 4 is an enlarged sectional view taken substantially through a plane indicated by section line 4—4 in FIG. 3 illustrating the rotor blade transmission.

FIG. 5 through 7 are simplified side elevational views of the helicopter in different operational modes.

Referring now to the drawings in detail, FIGS. 1 and 2 illustrate a helicopter constructed in accordance with the present invention generally referred to by reference numeral 10. An airframe assembly of suitable construction generally referred to by reference numeral 12 supports all of the operating components of the helicopter and may also be provided with any suitable ground supporting structure. By way of example, a pair of wheel assemblies 14 extend laterally from the airframe adjacent the forward end 16 and are rotatable about a horizontal axis fixed relative to the airframe. A dirigible wheel assembly 18 on the other hand is pivotally mounted by the airframe adjacent the rear end 20. The airframe assembly also encloses space for the pilot and accordingly mounts therewithin the pilot seat 22 in operative relation to a flight control assembly generally referred to by reference numeral 24. A suitable power plant (not shown) drives a vertical power shaft extending upwardly to a pair of counterrotating rotor assemblies 26 and 28 drivingly connected to the power shaft by a transmission assembly 30 located below the rotor assemblies but above the top frame member 32 of the airframe assembly 12. The transmission assembly 30 together with the rotor assemblies are adapted to be pivotally displaced by the pilot through the control assembly 24 and the linkage system 34 which operatively connects the control assembly to the transmission 30 and to a pair of vertical stabilizers 36 and 38 pivotally mounted by the airframe assembly about a common horizontal axis. The stabilizers are disposed in lateral spaced relation to the airframe on either side thereof as shown in FIG. 1 within the downdraft of the rotor blade assemblies 26 and 28.

The upper rotor assembly 26 includes a spider hub portion 40 from which blade shafts 42 extend. Each blade shaft 42 mounts an airfoil blade 44 spaced from the rotational axis of the rotor assembly a distance sufficient to avoid the zone adjacent the rotational axis where no measurable lift would be obtained during rotation of the rotor assembly. The lower rotor assembly 28 is similarly provided with a spider hub portion 46 rotatable about the same rotational axis from which the blade shafts 48 extend. The airfoil blades 50 are also spaced from the rotational axis and are disposed at a pitch angle opposite to the pitch angle of the upper airfoil blade 44 as more clearly seen in FIG. 1, in view of the counterrotating relationship between the rotor assemblies. Further, the pitch angle of the lower blades 50 is less than that of the upper blades 44 at a predetermined pitch ratio necessary to provide torqueless lift requiring no corrective controls.

As shown in FIG. 4, the transmission assembly 30 includes a gear housing including a case 52 pivotally mounted on top of the airframe assembly. Toward this end, the top frame member 32 is provided with a pair of aligned pivotal mounting assemblies 54 within which the pivot projections 56 of the gear case 52 are received. The gear case 52 is also provided with a pivotal connecting assembly 58 through which a pivotal connection may be established in parallel spaced relation to the pivotal mounting axis extending through the pivot projections 56. The gear housing is thereby pivotally adjusted to different positions through the linkage system 34 as will be hereafter explained.

A tubular projection 60 extends downwardly from the gear case 52 between the pivot projections 56 and mounts a self-aligning thrust bearing assembly 62 for an inner shaft assembly 64. A pivotal joint 66 is connected to the lower end of the inner shaft assembly 64 and is adapted to be connected to the single power shaft hereinbefore referred to which is shown by dotted lines in FIG. 4 and denoted by reference numeral 68. Thus, power may be transmitted from the power shaft 68 to the transmission 30 in all of its pivotal positions even though the power shaft is rotatably mounted by the airframe assembly about a fixed vertical axis.

The inner shaft assembly 64 extends upwardly through the gear housing closed by the cover 70 which is secured by fasteners 72 to the gear casing 52. The upper end portion 74 of the inner shaft assembly is connected to the hub portion 40 of the upper rotor assembly 26. An outer tubular shaft 76 is rotatably mounted by a self-aligning thrust bearing assembly 78 within the cover 70 in coaxial relation to the inner shaft assembly. Secured to the lower end of the outer shaft 76, is a sprocket gear 80 axially spaced by the tubular spacer 82 from the spur gear 84 secured to the inner shaft assembly 64. The gear 84 meshes with a countershaft gear 86 secured to a countershaft 88 which is rotatably mounted by the bearings 90 and 92 in the gear case and gear cover respectively. A sprocket gear 94 is secured to the countershaft 88 for rotation with the gear 86 in parallel spaced relation to the common rotor axis about which the gear 84 is rotated by the inner shaft assembly 64. An endless sprocket chain 96 drivingly connects the sprocket gear 94 to the sprocket gear 80. Accordingly, the gear 84 transmits rotation from the inner shaft assembly to the countershaft 88 in an opposite direction, rotation being transmitted by the sprocket chain 96 from the countershaft to the outer shaft 76 in the same direction. The inner shaft assembly and outer shaft therefore rotate in opposite directions and at the same speed in order to impart counterrotation to the rotor blade assemblies to which they are respectively connected.

As more clearly seen in FIG. 3, the control assembly 24 includes a steering wheel 98 connected to the end of a steering shaft 100 which is rotatably mounted adjacent the upper end of a control lever 102. The control lever is pivotally mounted by the air frame assembly intermediate the upper and lower ends thereof by means of the pivot pins 104. Accordingly, the pilot may exercise control over the craft by turning the steering wheel about the rotational axis of the steering shaft 100 and by pivotally displacing the control lever 102 about its pivot pins 104. These control movements of the control assembly are transmitted through the linkage system 34 to the pivotally mounted transmission 30 and the vertical stabilizers 36 and 38.

It will be observed from FIGS. 2 and 3, that a spool 106 is connected to the steering shaft 100 so as to displace a cable 108 anchored thereto in opposite directions in response to rotation of the steering wheel 98. The cable is entrained about a pair of idler pulley wheels 110 rotatably mounted adjacent the lower end of the control lever 102. Accordingly, the opposite runs of the cable extend from the idler pulley wheels 110 rearwardly to a pair of idler pulleys 112 rotatably mounted by the rod 114 secured to the rear end of a connecting rod 116 pivotally connected to the lower end of the control lever 102. The cable runs extend upwardly and rearwardly from the idler pulleys 112 to a pair of pulleys 118 rotatably mounted at the rear end of a crank arm 120 which is pivotally mounted on the airframe by the pivot bracket 122. The crank arm 120 is connected by the angularly spaced crank arm 124 to the rod 114 on which the pulley wheels 112 are rotatably mounted. The cable runs extend from the pulley wheels 118 upwardly and the ends thereof are anchored in spaced relation to each other by the anchor elements 126 to a control bar 128. The control bar 128 is mounted for pivotal displacement about an axis through a pivot shaft 130 rotatably mounted by the airframe assembly. The control bar is also capable of being pivotally displaced about an axis perpendicular to the axis extending through the pivot shaft 130. Toward this end, a rod 132 is connected to the pivot shaft 130 intermediate the ends thereof and is slidably received within a tubular extension 134 projecting forwardly from the control bar 128. The ends of the control bar are connected to the rear ends of a pair of coil springs 136 which urge the opposite ends of the control bar toward the pivot shaft 130 so as to resist any angular displacement of the control bar about rod 132 away from the pivot shaft. The coil springs 136 therefore are pivotally displaceable about the axis of pivot shaft 130 by being anchored to a pair of control sleeves 138 and 140 rotatably mounted on the pivot shaft on either side of the rod 132. It will be apparent therefore, that angular displacement of the steering wheel 98 in one direction or the other will tension one end of the cable 108 or the other causing pivotal displacement of the control bar 128 about the axis of the rod 132 against the bias of the springs 136. The control bar is provided with a pair of slide connections 142 to the control sleeves 138 and 140 on opposite sides of the rod 132 so that pivotal displacement of the control bar about the rod 132 will cause angular displacement of the control sleeves 138 and 140 in opposite directions on the pivot shaft 130. The control sleeves are provided with connecting arms 144 and 146 adjacent opposite ends of the pivot shaft to which the connecting links 148 and 150 are pivotally connected. The opposite ends of the connecting links are pivotally connected to arms 152 and 154 respectively depending from the control shaft 156 and 158 to which the vertical stabilizers 36 and 38 are connected. The stabilizer control shafts 156 and 158 are pivotally mounted by pivot brackets on the airframe assembly about a common fixed axis while one end of the control shaft 156 rotatably receives the control shaft 158 so that the control shafts may be rotated relative to each other. Thus, when the control sleeves 138 and 140 are angularly displaced in opposite directions through the cable 108 upon rotation of the steering wheel 98, the vertical stabilizers 36 and 38 will be angularly displaced about their common horizontal axis in opposite directions by the control shafts 156 and 158. The vertical stabilizers are provided with airfoil shapes which taper to leading edges at the upper and lower ends thereof in order to establish laminar flow along its surfaces within the downdraft of the rotor blade assemblies.

With continued reference to FIGS. 2 and 3, it will be observed that the crank arm 120 is pivotally connected to the lower end of a connecting rod 160, the upper end of which is pivotally connected to an intermediate portion of the control bar 128 to which the lower end of a turnbuckle device 162 is connected. Thus, pivotal displacement of the control lever 102 is operative to angularly displace the crank arm 120 through the connecting link 116 and crank arm 124 and thereby angularly displace the control bar 128 through the connecting rod 160 about the pivot shaft 130. Then so displaced about the pivot shaft, the control bar 128 angularly displaces both control sleeves 138 and 140 in the same angular direction to thereby cause angular displacement of both vertical stabilizers 36 and 38 in the same angular direction rather than in opposite angular directions as hereinbefore described in connection with cable operated movement of the stabilizers through steering wheel 98. Angular displacement of the control bar 128 about the axis of the pivot shaft 130 is operative through the turnbuckle device 162 and the lever arm 164 to angularly displace the pivot shaft 166 rotatably mounted about a fixed axis by the frame assembly. The crank arms 168 project rearwardly from the pivot shaft 166 adjacent opposite ends and are connected by the connecting rods 170 to the rear end portion of the transmission assembly 30 through the pivotal connecting assembly 58. Accordingly, pivotal displacement of the control lever 102 simultaneously produces angular displacement of the vertical stabilizers in the same direction and pivotal displacement of the transmission assembly 30.

As more clearly seen in FIG. 3a, the turnbuckle device includes a spool 172 fixed to the internally threaded sleeve member 174 which threaded receives oppositely threaded connectors 176. Angular displacement of the spool 172 accordingly produces elongation or contraction of the turnbuckle device in length in order to correspondingly change the angular position of the transmission assembly. A cable 178 is connected to the spool 172 with opposite runs thereof being entrained about pairs of idler pulleys 180 and 182. The cable extends to and is entrained about a control pulley 184 to which a trimmer control 186 is connected. The trimmer control 186 and its pulley is mounted adjacent the control assembly 24 so that it may be manipulated by the pilot in order to effect a fine pivotal adjustment of the transmission assembly independently of any control movements being imparted by the control assembly 24 as hereinbefore described.

With the rotor assemblies 26 and 28 positioned by the transmission assembly 30 with the common rotor axis substantially perpendicular to the longitudinal axis of the helicopter air frame, vertical lift only is produced as illustrated in FIG. 5. Both vertical stabilizers 36 and 38 in this operational mode are maintained substantially perpendicular to the horizontal rotor blade assemblies in order to maintain stability of the craft during lift. When a desired altitude is reached the rotor blades together with the transmission assembly 30 are canted forwardly as shown in FIG. 6 in order to produce forward movement of the airframe assembly. This pivotal displacement of the transmission and rotor assemblies is effected by forwardly displacing the control lever 102. As hereinbefore described and as illustrated in FIG. 6, such forward displacement of the control lever 102 will also produce forward angular displacement of both stabilizers 36 and 38. Thus, during forward movement of the airframe assembly, the impact of the airflow on the stabilizers due to forward movement acts to overcome gyroscopic forces that would otherwise change the attitude of the airframe assembly. For rearward movement of the airframe assembly, the transmission and rotor assemblies will be pivotally displaced in a direction opposite to that illustrated in FIG. 6 by means of the control lever 102 in which case the stabilizers 36 and 38 will also be simultaneously displaced in a rearward direction. On the other hand, when it is desired to turn the craft, angular displacement of the steering wheel 98 will cause canting of the transmission and rotor assemblies as shown in FIG. 7 and at the same time cause angular displacement of the stabilizers 36 and 38 in opposite directions. The stabilizers then act to produce turning forces on the airframe assembly about its vertical axis. Thus, the vertical stabilizers not only function to overcome gyroscopic forces but also cooperate to effect directional maneuvering of the craft. Hence, in all operational modes of the craft, the airframe assembly is maintained at the same level attitude as illustrated in FIGS. 5, 6 and 7. The trimmer control 186 hereinbefore described is provided in order to produce a slight canting of the transmission and rotor assemblies should some adjustment be necessary to maintain the craft in its level attitude under all conditions.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. In a helicopter having an airframe, a drive shaft rotatably mounted by the airframe about a fixed axis, a pair of rotor blades producing a vertical downdraft, transmission means drivingly connecting said drive shaft to the rotor blades for rotation in opposite directions about a common rotor axis intersecting the fixed axis, means mounting said transmission means on the airframe for angular displacement about a pivotal axis extending through the intersection of said rotor axis and the fixed axis of the drive shaft, airflow responsive stabilizing means movably mounted by the airframe in the downdraft of the rotor blades for overcoming gyroscopic forces generated by rotation of said rotor blades during horizontal movement of the airframe, and control means operatively connected to the transmission means and the stabilizing means for synchronized displacement of the transmission means and the stabilizing means to directionally control said horizontal movement of the airframe, said stabilizing means including at least two airfoil members, means pivotally mounting the airfoil members on the airframe for displacement by the control means from positions substantially parallel to said downdraft of the rotor blades and transverse to the direction of movement of the airframe, said control means including a control member displaceable in different planes relative to the airframe, linkage means connecting said control member to the transmission means and the airfoil members for simultaneously tilting the rotor blades and airfoil members in the same direction in response to displacement of the control member in one of the planes or tilting the airfoil member in opposite directions without tilting the transmission means in response to displacement of the control member in the other of the planes.

2. The combination of claim 1 wherein the control means further includes attitude trimmer means for tilting the transmission means independently of the control member.

3. In a helicopter having an airframe, a drive shaft rotatably mounted by the airframe about a fixed axis, a pair of rotor blades producing a vertical downdraft, transmission means drivingly connecting said drive shaft to the rotor blades for rotation in opposite directions about a common rotor axis intersecting the fixed axis, means mounting said transmission means on the airframe for angular displacement about a pivotal axis extending through the intersection of said rotor axis and the fixed axis of the drive shaft, airflow responsive stabilizing means movably mounted by the airframe in the downdraft of the rotor blades for overcoming gyroscopic forces generated by rotation of said rotor blades during horizontal movement of the airframe, and control means operatively connected to the transmission means and the stabilizing means for synchronized displacement of the transmission means and the stabilizing means to directionally control said horizontal movement of the airframe, said transmission means comprising a gear housing pivotally mounted on the airframe, an inner shaft journaled by said housing and connected to an upper one of said pair of rotor blades, pivotal coupling means connecting said inner shaft to the other of said pair of rotor blades and journaled by the housing in coaxial relation to the inner shaft, and positive gearing drivingly connecting said inner and outer shafts within the housing for rotation at the same speed in opposite directions, said stabilizing means including at least two airfoil members, means pivotally mounting the airfoil members on the airframe for displacement by the control means from positions substantially parallel to said downdraft of the rotor blades and transverse to the direction of movement of the airframe, said control means including a flight control lever, means operatively connecting the gear housing and the airfoil members to the control lever for simultaneously tilting the gear housing and pivotally displacing the airfoil members in the same direction in response to movement of the control lever from a neutral position, a steering control member, and means operatively connecting the gear housing and airfoil members to the steering control member for simultaneously tilting the gear housing and pivotally displacing the airfoil members in opposite directions in response to movement of the steering control member from a neutral position.

4. The combination of claim 3 wherein the control means further includes attitude trimmer means for tilting the gear housing independently of the control member.